United States Patent
Lopez Mendez et al.

(10) Patent No.: US 12,067,798 B2
(45) Date of Patent: Aug. 20, 2024

(54) BODY POSE TRACKING SYSTEM AND METHOD

(71) Applicant: Arm Limited, Cambridge (GB)

(72) Inventors: Roberto Lopez Mendez, Cambridge (GB); Daren Croxford, Swaffham Prior (GB); Peter James Samuel Ferguson, Cambridge (GB); Judicael Sean Eugene Clair, London (GB); Koki Mitsunami, Altrincham (GB); Benjamin Charles Clark, Cambridge (GB); Mina Ivanova Dimova, Great Shelford (GB); Pavel Rudko, Cambridge (GB)

(73) Assignee: Arm Limited, Cambridge (GB)

( * ) Notice: Subject to any disclaimer, the term of this patent is extended or adjusted under 35 U.S.C. 154(b) by 409 days.

(21) Appl. No.: 17/573,186

(22) Filed: Jan. 11, 2022

(65) Prior Publication Data
US 2023/0222830 A1 Jul. 13, 2023

(51) Int. Cl.
*G06T 7/50* (2017.01)
*G06T 7/73* (2017.01)
(Continued)

(52) U.S. Cl.
CPC ............... *G06V 40/10* (2022.01); *G06T 7/50* (2017.01); *G06T 7/75* (2017.01); *G06V 10/82* (2022.01); *G06T 2207/10024* (2013.01); *G06T 2207/10028* (2013.01); *G06T 2207/20081* (2013.01); *G06T 2207/20084* (2013.01)

(58) Field of Classification Search
CPC ........ G06V 40/10; G06V 10/82; G06V 40/25; G06T 7/50; G06T 7/75; G06T 2207/10024; G06T 2207/10028; G06T 2207/20081; G06T 2207/20084; G06T 2207/10048; G06T 2207/30172; G06T 2207/30196
See application file for complete search history.

(56) References Cited

U.S. PATENT DOCUMENTS

| | | |
|---|---|---|
| 11,507,203 B1 * | 11/2022 | Bosworth ............. G06F 3/0304 |
| 2002/0103610 A1 * | 8/2002 | Bachmann ......... G01C 21/1654 |
| | | 702/94 |

(Continued)

OTHER PUBLICATIONS

Steffen Knoop, Stefan Vacek, and Rudiger Dillmann: "Fusion of 2d and 3d sensor data for articulated body tracking", 2009; Robotics and Autonomous Systems 57; pp. 321-329. (Year: 2009).*

*Primary Examiner* — Siamak Harandi
(74) *Attorney, Agent, or Firm* — Leveque Intellectual Property Law, P.C.

(57) ABSTRACT

Systems, apparatuses, devices and methods for body pose tracking are provided that are simple, inexpensive, flexible, accurate and robust. One body pose tracking system includes a mobile device, such as a smartphone, and active or passive marker bands. Images and depth information captured by the smartphone may be analyzed using an Inverse Kinematic (IK) model, and, in certain cases, the IK model solution may be augmented by machine learning. Other body pose tracking systems include an augmented-reality/virtual-reality (AR/VR) head-mounted-display (HMD) and/or AR/VR glasses rather than a smartphone. An AR/VR HMD device may include a depth sensor and multiple environment-facing cameras.

20 Claims, 5 Drawing Sheets

(51) Int. Cl.
*G06V 10/82* (2022.01)
*G06V 40/10* (2022.01)

(56) References Cited

U.S. PATENT DOCUMENTS

2008/0285805 A1* 11/2008 Luinge .................... G06F 3/011
    382/128
2018/0150131 A1* 5/2018 Ranieri .................... G06F 3/017

* cited by examiner

BODY POSE TRACKING SYSTEM AND METHOD

BACKGROUND

Body pose tracking is used in a variety of applications, from Augmented Reality (AR) and computer gaming to sport and health. Traditional body pose tracking systems are complex, expensive and inflexible. Generally, these systems determine the pose of the body by placing passive infra-red (IR) markers on the limbs of the body, placing the body within a specifically-designed capture space in which peripheral IR cameras provide IR images of the body from different angles, illuminating the body with IR light and recoding the IR images, and then estimating the pose of the body based on the locations of the IR markers in the IR images.

Machine learning (ML) approaches to predict body pose from a video stream, such as deep learning (DL) using artificial neural networks (ANNs), have become popular alternatives to traditional body pose tracking systems. However, current DL approaches experience limitations in terms of accuracy and robustness when compared to marker-based approaches.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding or analogous elements.

DETAILED DESCRIPTION

Figure 1:
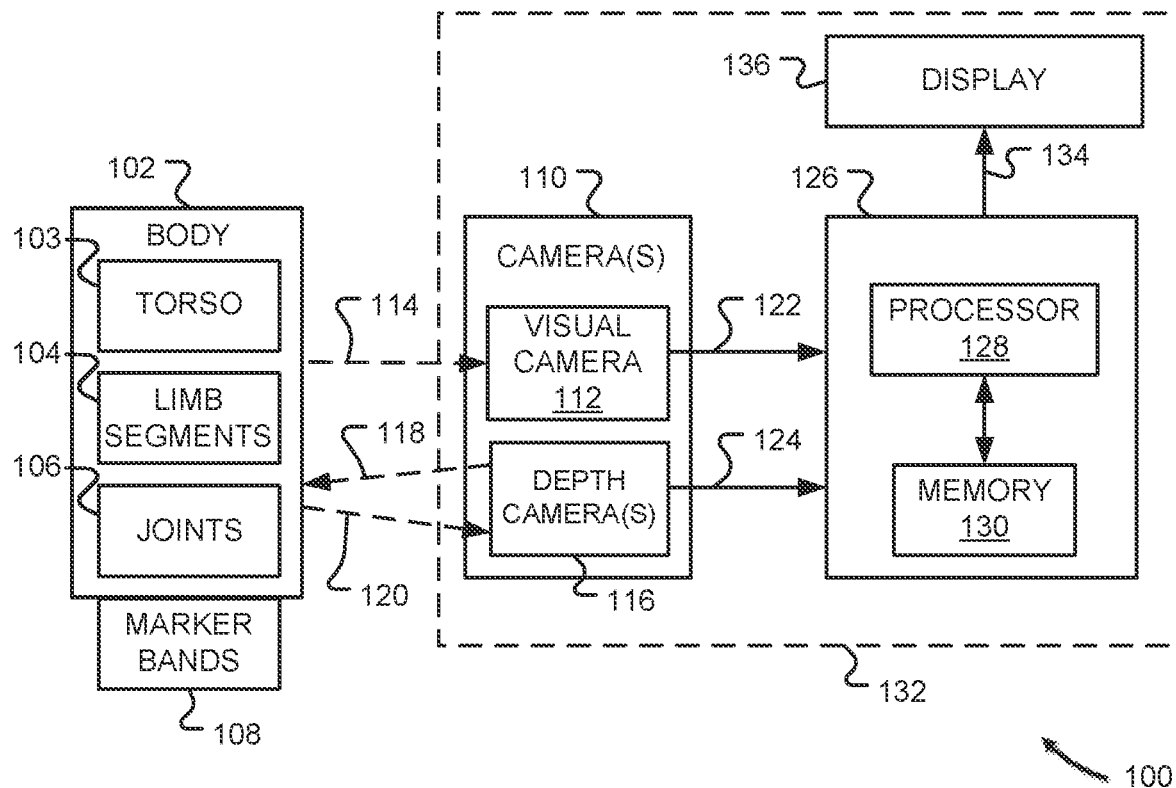
FIG. 1 is a block diagram of a body pose tracking system and a body, in accordance with various representative embodiments.

The various methods, systems, apparatus and devices described herein provide mechanisms for capturing poses and motion of a body, such as human body.

While the present disclosure is receptive of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

Embodiments of the present disclosure advantageously provide systems, apparatuses devices and methods for body pose tracking that are simple, inexpensive, flexible, accurate and robust. In many embodiments, the body pose tracking system includes a mobile device, such as a smartphone, and active (or passive) marker bands. Images and depth information captured by the smartphone may be analyzed using an Inverse Kinematic (IK) model, and, in certain embodiments, the IK model solution may be augmented by machine learning (ML). In other embodiments, the body pose tracking system includes an augmented-reality/virtual-reality (AR/VR) head-mounted-display (HMD) and/or AR/VR glasses rather than a smartphone. An AR/VR HMD device may include a depth sensor and multiple environment-facing cameras. For example, a virtual reality device may have four, wide-angle, front facing cameras for positioning and hand tracking.

Embodiments of the present disclosure capture an image of the body in combination with corresponding depth information. The depth information relates to the distance from the camera that captured the image to a point or region of the body shown in the image. Such information is commonly captured by devices such as smartphones. Some smartphones may have multiple cameras that capture stereoscopic images. A map of the disparity between the multiple images can be analyzed to provide depth information. Other smartphones have a dedicated depth sensor that provides depth information directly. The depth sensor may illuminate the body and measure a time-of-flight of light reflected from the body. Infra-red or near infra-red light may also be used. The availability of depth information simplifies the image processing task.

FIG. 1 is a block diagram of a body pose tracking system 100 and a body 102, in accordance with various representative embodiments.

For the purposes of this disclosure, body 102 includes at least limb segments 104 and joints 106, and, in certain embodiments, torso 103 as well. Body 102 may be a human body or an animal body. Generally, a limb includes several limb segments 104. For example, an arm (i.e., a limb) includes an upper arm (i.e., a limb segment) coupled to the torso via a shoulder joint and a lower arm (i.e., a limb segment) coupled to the upper arm via an elbow joint. A leg (i.e., limb) includes a thigh (i.e., limb segment) coupled to the torso via a hip joint and a lower leg (i.e., limb segment) coupled to the thigh via a knee joint. In certain embodiments, the hands are also limb segments, which are coupled to the lower arms via respective wrist joints. Additionally, the fingers may also be limb segments, which are coupled to the hands via respective knuckle joints. Similarly, in certain embodiments, the feet are also limb segments, which are coupled to the lower legs via respective ankle joints. Additionally, the toes may also be limb segments, which are coupled to the feet via respective knuckle joints. The body 192 may also include the neck and head, as well as the tail for animals.

The body pose tracking system 100 includes marker bands 108. Each marker band 108 is constructed and sized to enable it to be placed around a limb segment 104 of the body 102, and, in certain embodiments, at least one marker band 108 may be constructed and sized to enable it to be placed around the torso 103. In certain embodiments, the marker bands 108 are constructed from a loop of elastic material that stretches, to a certain extent, to match the diameter of the limb. Different resting or "unstretched" loop diameters may be provided for different body sizes. In other embodiments, the marker bands 108 are constructed from a length of inelastic material whose ends are joined by a fastener, such as, for example, a strap, a buckle, a hook-and-loop fastener, etc. In these embodiments, the diameter of an attached marker band 108 may be adjusted, using the fastener, to match the diameter of the limb.

A marker band 108 may include active or passive markers affixed thereto or incorporated therein, such as, for example, light emitters (i.e., active markers), colored material (i.e., passive markers), light reflective material (i.e., passive markers), etc. A limb segment 104 may have one or more marker bands 108 attached to it.

A light emitter has a light intensity or color that enables it to be easily distinguished in an image of the body 102. Light emitters may be powered by one or more batteries integrated within, or coupled to, the marker band 108. Similarly, a colored or reflective marker may be illuminated to produce regions of high intensity light, again facilitating identification within an image. In one embodiment, the light emitters are light emitting diodes (LEDs). In certain embodiments, each marker band 108 includes LEDs having the same color, such as, for example, white, red, blue, green, etc. Marker bands 108 with different colors may be used to identify different limb segments or different regions of a limb segment. A marker band 108 may include a loop of expandable material or a strip of material together with a means for fastening the strip around a limb segment 104 of the body 102. The fastening means may a hook-and-loop fastener, a buckle, a snap, a button, a tie or other fastener.

The body pose tracking system 100 also includes capture device 110. Capture device 110 includes visual camera 112 for capturing an image the body 102 and attached marker bands 108, and for producing an RGB image 122 (reflected by light path 114). RGB image 122 may be a digital color image including red, green and blue (RGB) components, or other equivalent color components, of each pixel in the image. The image contains, inter alia, the visible portions of the body 102 as well as the visible portions of the marker bands 108, i.e., the portions of the body 102 and the portions of the marker bands 108 that are visible (unobstructed, unobscured, etc.) to the lens of camera 112.

In many embodiments, capture device 110 also includes one or more depth cameras 116, located in proximity to visual camera 112, to acquire depth information. More particularly, the depth camera 116 is operable to determine distances to the visible portions of the marker bands 108. In one embodiment, light 118 is emitted from the capture device 110 to illuminate the body 102 and marker bands 108, and a depth camera 116 captures reflected light 120. Light 118 may be non-visible coherent light, such as an infra-red or near infra-red light. In one embodiment, depth camera 116 includes a time-of-flight (ToF) sensor. In another embodiment, depth camera 116 includes a light detection and ranging (LiDAR) sensor. In other embodiments, one or more visual cameras 112 may be used as the depth camera 116. In one embodiment, a ToF software application may be used to determine the depth information based on the RGB image, while in another embodiment, the differences or disparities between the images captured by multiple visual cameras 112 may be used to determine the depth information. It will apparent to those of skill in the art that capture device 110 may include additional elements, such as a memory for storing images and distance measurements, etc.

In many embodiments the digital image and the depth information are referred to, collectively, as "RGB-D image data", or simply an "RGB-D image."

The body pose tracking system 100 includes processing subsystem 126 including, inter alia, processor 128 and memory 130. Processor 128 may include a central processing unit (CPU), a graphics processing unit (GPU), a neural processing unit (NPU), etc. Memory 130 is configured to store computer instructions that, when executed by processor 128, determine the pose and/or motion of the body 102. The pose and/or motion may be described by the positions and angles of the joints 106, and, in certain embodiments, by the positions of the limb segments 104 as well.

In many embodiments, capture device 110, processing subsystem 126 and display 136 may be integrated into a portable electronic device 132, such as, for example, a smartphone, tablet or laptop computer, AR/VR HMD device, AR/VR glasses, etc. The portable electronic device 132 may also contain a light source, such as a camera flash, flash-light application, etc., for illuminating marker bands 108. In some embodiments, an additional processing subsystem, such as a server computer, may be connected to the portable electronic device 132 via one or more networks, such as, for example, WiFi networks, the Internet, etc.

Data may be processed off-line. However, it may be advantageous to perform some limited real-time processing when the RGB-D image is captured in order to verify that the information is good enough for later analysis.

The pose 134, with attendant data, may be shown on display 136. In many embodiments, the predicted or estimated joint angles and positions may be used to produce a rendering of a virtual body for viewing on display 136. Optionally, the rendering may be displayed together with the captured image of the body 102 so as to allow a visual comparison. Similarly, a sequence of images of a video may be displayed synchronously with a rendering of the motion of the corresponding virtual body.

As discussed in more detail below, many embodiments of the method include certain functionality. Two-dimensional (2D) locations in the image, corresponding to visible portions of the marker bands, are first determined. Three-dimensional (3D) locations of the visible portions of the marker bands are then determined from the 2D locations and the depth information. Virtual bands are then fit to the 3D locations of the visible portions of the marker bands to generate 3D positions of the virtual bands, and the pose is determined by fitting a skeletal model of the body to the 3D positions of the virtual bands.

Figure 2:
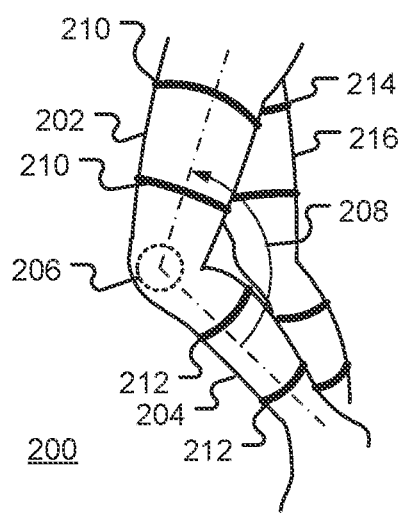
FIG. 2 is a diagrammatic representation of a portion of a body, in accordance with various representative embodiments.

FIG. 2 is a diagrammatic representation of a portion 200 of a body, in accordance with various representative embodiments.

The body includes limb segments 202 and 204 coupled by joint 206. Joint 206 is rotatable about one or more axes. In the example shown, the joint 206 is a hinge-type joint that is rotatable to alter angle 208 between the limb segments 202, 204. Marker bands 210 (i.e., marker bands 108) are placed around limb segment 202, while marker bands 212 (i.e., marker bands 108) are placed around limb segment 204. Each marker band 210, 212 includes a number of passive or active markers, such as LEDs. In practice, each body has a certain number of limb segments and joints. Colored active markers, such as colored LEDs, may be used to identify different parts of the body and the left/right body side. The marker bands 210, 212 may be arranged in predetermined shapes such as bands or strips attached to the body. It should be noted that the back half of each marker band 210, 212 is not visible to cameras 112, 116 due to the limb segment 202, 204 to which the marker band 210, 212 is attached. In other words, the visible portion of each marker band 212, 212 is typically 50% or less than the length or circumference of the marker band 210, 212. Marker band 214, positioned around limb segment 216, is farther from the depth camera 116 (i.e. at a greater depth), and the visible portion of marker band 214 may be partially or completely obscured by limb segment 202.

Advantageously, in many embodiments, compact, self-powered, light-emitting active markers facilitate the detection of the visible portion of each marker band 108 in the image. For example, a simple intensity filter can be used to separate the high-intensity light emitters or reflectors from the background in the image. Other approaches may be used, such as the Random Sample Consensus (RANSAC) algorithm. This approach uses a small set of possible marker locations and proceeds to enlarge this set with consistent data points.

Embodiments of the present disclosure include a skeletal model to determine the position and orientation of the limb segments from the positions and angels (or rotations) of the connecting joints. One embodiment of the skeletal model is the IK model that determines the positions and angles of the joints from the position and orientation of the limb segments, which are derived from the positions of the visual marker bands. The parameters of each joint of a particular structure, such a joint angle or rotation, position, etc., are restricted to be within designated ranges. These restrictions are built into an IK model and provide increased robustness and accuracy of pose calculations by eliminating unnatural or unachievable poses.

The IK model relies on limb measurements of the body, which may be entered manually or retrieved from a memory in response to a login procedure for the subject, such as facial recognition. In other embodiments, the system 100 may acquire images of the body in different positions to compute the limb measurements. If the system 100 has difficulty converging on a complete or final solution because the positions of the visible portions of the marker bands 108 are not easily fit to the IK model, this may indicate problems with the limb measurement data, which may be verified or re-acquired by the operator.

Embodiments of the present disclosure may be used for motion capture of humans (adult or child), animals (such as dogs and cats) or other jointed bodies. The analysis may be configured and/or trained for each application using the known or measured properties of the structure (such as limb segment length, joint constraints, etc.).

Figure 3:
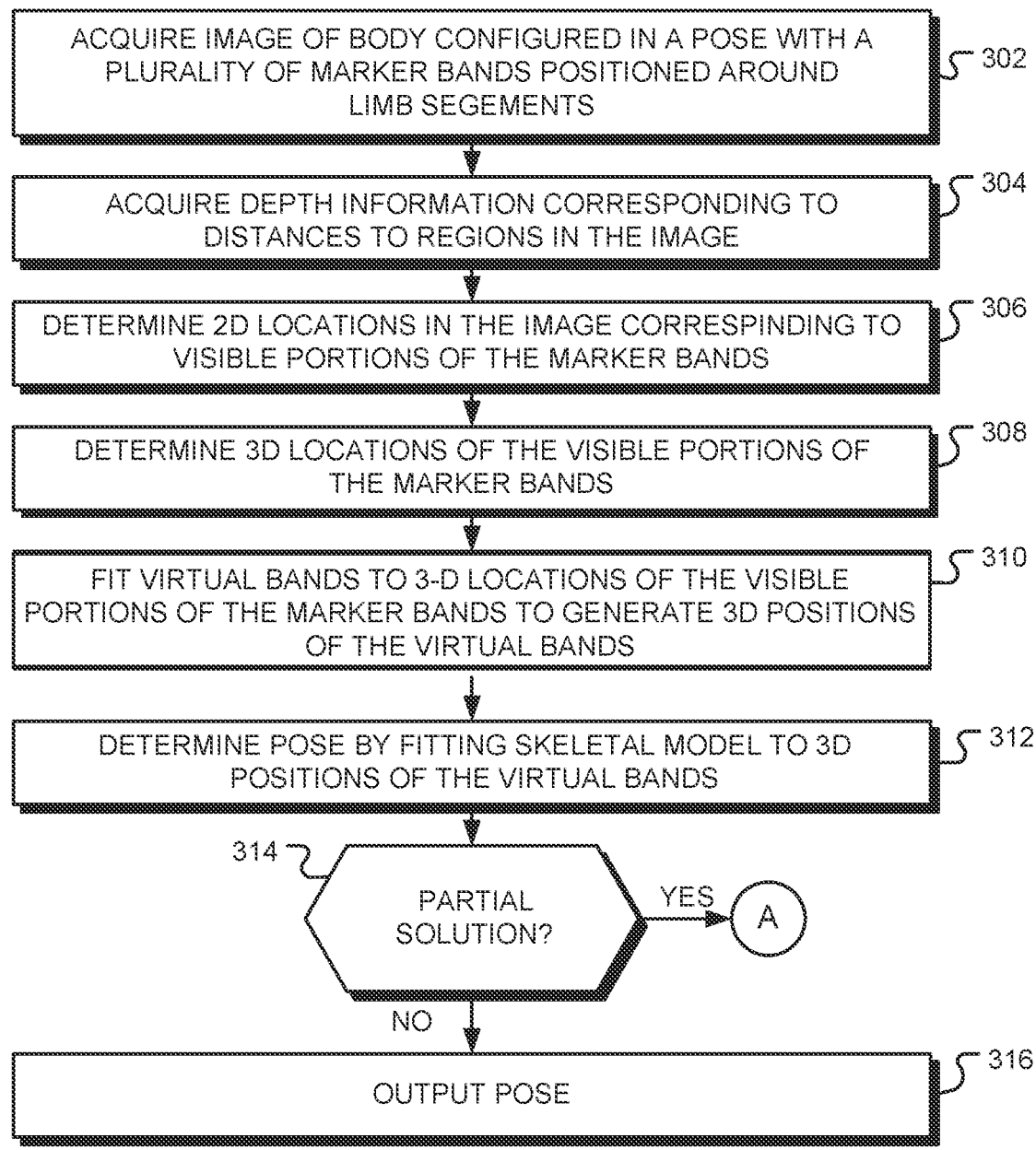
FIG. 3 is a flow chart of a method, in accordance with various representative embodiments.

FIG. 3 is a flow chart 300 of a method, in accordance with various representative embodiments.

At 302, an image of a body 102 including a plurality of limb segments 104 is acquired. The body 102 is configured in a pose and a plurality of marker bands 108 are positioned around the limb segments 104. In this embodiment, the marker bands 108 include active light emitters, such as LEDs.

At 304, depth information corresponding to distances to regions in the image is acquired by depth camera 116. As discussed above, depth information may be acquired, for example, by a depth sensor that is co-located, or disposed in close proximity, to the camera 112. In one embodiment, the depth information may include the distances from the camera 116 to each pixel in the image.

At 306, two-dimensional (2D) locations in the image corresponding to visible portions of the marker bands 108 are determined. Since the active light emitters have a higher intensity than the surrounding areas that are illuminated by ambient light only, the active light emitters may be readily identified in the image and correspond to the visible portions of the marker bands 108. In another embodiment, the marker bands 108 include passive markers that have or reflect distinct colors that differ from the person's clothes and/or background. For example, a red marker pixel with red component R satisfies R>0.5+G and R>0.5+B where G and B are the normalized green and blue components, respectively.

At 308, three-dimensional (3D) locations of the visible portions of the marker bands 108 are determined from the 2D locations and the depth information.

At 310, virtual bands are fit to the 3D locations of the visible portions of the marker bands 108 to generate 3D positions of the virtual bands. Here, fitting means determining the location and orientation of the virtual bands, referred to here as the 3D positions of the virtual bands. The virtual bands may be simple geometric shapes, such as circles or ellipses. The virtual bands include the locations of the visual portions of the marker bands 108 as well as intermediate points referred to as "inliers". Body measurements may be provided, such as the sizes of the marker bands 108 or the length of the limb segments 104. This enables visual bands of other sizes to be rejected. As described above, a RANSAC algorithm may be used to identify the virtual bands. In one embodiment, where the virtual bands are assumed to be circles, the approach is:

Randomly sample three nearby points and exactly fit a 3D circle.
Determine inliers, which are points within a small threshold of the circle.
If circle has sufficient inliers, refine circle by fitting it to all inliers, otherwise go to "randomly sample" step.
Re-determine set of inliers.
Repeat "refine circle" and "re-determine set of inliers" steps several times.
Go to "randomly sample" step if:
  circle radius infeasible, or
  circle center is too close to "detected" circle centers (similarity check), or
  too many inliers of "detected" circles are inliers of this circle (similarity check).
If circle has sufficient inliers:
  Circle is "detected"
  Exclude inliers from future sampling
  Terminate if insufficient number of points left, otherwise go to "randomly sample" step
Keep track of best "undetected" circle that is good enough
If maximum number of iterations reached, apply all sub-steps of "if circle has sufficient inliers" step with best "undetected" circle.

At 312, the pose is determined by fitting a skeletal model of the body to the 3D positions of the virtual bands. This may be done, for example, by adjusting the skeletal model so that the distance between the central axes of the limb segments of the skeletal model and the center positions of the virtual bands and inliers is minimized. An IK model may be used for this purpose, as described above. The limb segment lengths may be assumed or provided from measurements.

The skeletal model may have many degrees-of-freedom. For example, each hip joint may have three degrees-of-freedom and each knee joint may have three degrees-of-freedom. The skeletal model may include constraints on the joint angles. For example angles (X, Y, Z) of a knee may be constrained to satisfy (−80°, −1°, −1°)<(X, Y, Z)<(10°, 1°, 1°). The skeletal model may be fitted by performing a least-squares, bound-constrained optimisation in which each limb segment is matched to at most two circles (each circle can only be matched to one limb segment) while not all of the circles matched. Circle-segment pairs are matched to minimize the distance from the circle center to the limb segment. The residuals to be minimized in the optimization are the distances from the circle centers to their associated limb segments. For example, for determining the positions of two legs, the optimization variables include the position of hips, three angles for each hip joint and three angles for each knee joint for a total of 15 variables. Accuracy of the fitting may be improved through the use of parameter constraints. In addition, a hierarchical fitting may be performed. For example, the skeletal model may be fitted while keeping minor angles of knee joints (e.g. ones that can't exceed ±1°) fixed, or by keeping the while knee joints fixed (ignoring residuals produced by the lower legs). Alternatively, the skeletal model may be fitted while keeping the hip joints fixed (ignoring residuals produced by upper legs). The bones of the skeletal model may be assumed to at the centers of the circles of the virtual bands. Alternatively, the bones may be assumed to be at other positions. For example, a shin bone of a lower leg segment is located towards the front of a band around a calf.

In a further embodiment, fitting the skeletal model of the body to the 3D positions of the virtual bands may be done, for example, by adjusting the skeletal model so that the distance between the surface mesh of the limb segments of the skeletal model and the perimeters of the virtual bands and inliers is minimized. As described above, a least-squares, bound-constrained optimization and hierarchical fitting may be used. Since it is known which virtual band each circle corresponds to, this can be used as the limb segment "radius" at each band. The residual amount for each circle is computed as a difference between the "radius" and mean distance of inliers to skeleton.

The above iterative approach is capable of providing accurate pose identification for all of the joints. This accuracy is higher than can be achieved by existing machine learning approaches, for example, the best of which have an average error per joint of about 20 centimeters. In contrast, the above approach can provide sub-centimetre accuracy.

The accuracy of the approach may depend, inter alia, on how accurately the 3-D locations of the visual portions of the marker bands 108 can be determined, as well as on the accuracy of the skeletal model. When the intrinsic and extrinsic parameters of the camera are known, the depth camera 116 (which may be located about two meters from the body, or at some other distance) provides accurate depth information. The accuracy of the fitting process can be selected by adjusting a threshold imposed to stop the iterative fitting.

The resulting accuracy may be estimated experimentally by overlying the virtual mesh, corresponding with the calculated pose, on top of the original captured image and then determining how the different limbs fit the image. The error per joint can be averaged over all of the joints. Accuracy may also be determined for synthetic data set, for which the joint positions are known precisely.

In some instances, the skeletal model may be fitted even when one or more marker bands 108 cannot be identified. First, limbs are fitted to identified, visible bands. For example, if the upper leg limb band is hidden, but the lower leg band is visible, it may be possible to fit the lower leg to the visible band. Due to the restrictions of joint angles, the skeletal model can be used to provide a correct pose for the upper leg.

At 316, the pose is output. For example, a visual representation of the pose and attendant data may be output to display 136, the parameters of the fitted skeletal model may be provided as a description of the pose of the body and stored in memory 130, transmitted to another computer via a wired r or wireless network, etc.

In certain embodiments, a test of the completeness of the solution to the pose is performed at 314. If a complete solution to the pose was determined at 312, flow continues to 316 where the pose is output, as discussed above. However, if a partial solution to the pose was determined at 312, flow continues to "A".

Figure 4:
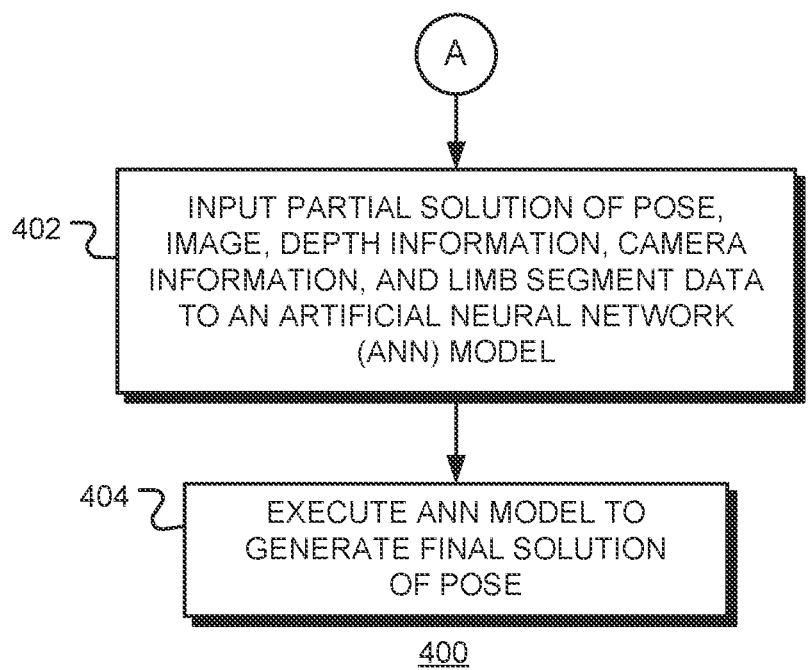
FIG. 4 is a continuation flow chart of the flow chart shown in FIG. 3, in accordance with various representative embodiments.

FIG. 4 is a continuation flow chart 400 of flow chart 300 shown in FIG. 3, according to an embodiment of the present disclosure.

If sufficient virtual bands (e.g. circles, ellipses, etc.) are not fit to the 3D locations of the visible portions of the marker bands 108 to support a complete solution to the pose, then the flow proceeds from 314 to 402. This may occur, for example, when one or more marker bands 108 are completely obscured from cameras 112, 116, when the 3D locations of the visible portions of the marker bands 108 are noisy, etc.

At 402, the partial solution of the pose, the image, the depth information, camera information associated with the image, and limb segment data are input to an artificial neural network (ANN) model. The ANN model is discussed in more detail below.

At 404, the ANN model is executed to generate a final solution of the pose, which is output at 316.

In certain embodiments, the accuracy of the predicted pose may be improved by using a temporal sequence of images and depth information to determine where the marker bands 108 were and/or were predicted to be in previous images, how fast a particular limb segment 104 is moving from frame to frame, etc. This information is then provided to an input to the ANN for further processing. In these embodiment, the ANN may be a recurrent convolutional neural network (RCNN) which uses information from previous images to enhance the predicted pose for the current image.

In certain embodiments, the accuracy of the predicted pose may be improved by using depth information to locate objects that are potentially obscuring the marker bands 108. For example, depth information may be provided directly to the ANN, or an indication where the likely regions where the marker bands 108 should be (e.g. indicate regions of the image that are obscured by a nearer object) may be provided to the ANN for further processing.

Figure 5:
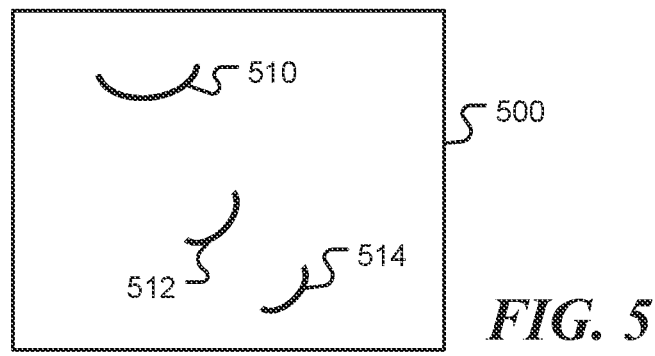
FIG. 5 is a diagrammatic representation of images of light emitting marker bands visible within an image of a body, in accordance with various representative embodiments.
Figure 6:
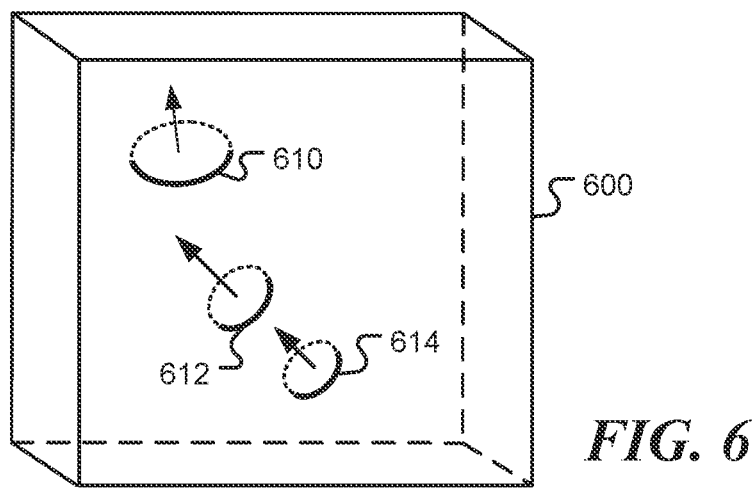
FIG. 6 is a diagrammatic representation of reconstructed locations of light emitting marker bands in a three-dimensional space, in accordance with various representative embodiments.
Figure 7:
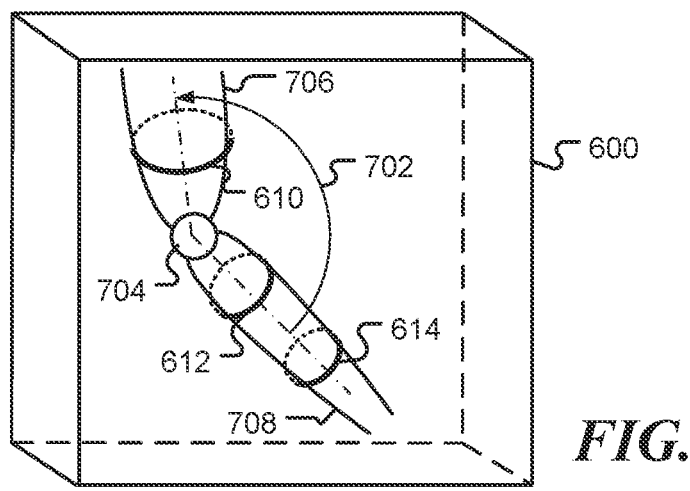
FIG. 7 is a diagrammatic representation of a portion of a pose, in accordance with various representative embodiments.

The method of pose identification is further illustrated in FIGS. 5, 6 and 7 for an example where the 3D positions of the virtual bands can be determined from the 3D locations of the visual portions of the marker bands 108.

FIG. 5 is a diagrammatic representation of images of light emitting marker bands 108 visible within an image 500 of a body, in accordance with various representative embodiments.

An intensity filter is used to remove regions of image 500 that lie below a designated threshold intensity value. The remaining regions, 510, 512 and 514, correspond to images of the visible portions of the light emitting marker bands 108. Image 500 is a 2D image.

FIG. 6 is a diagrammatic representation of reconstructed locations of light emitting marker bands 108 in 3D space 600, in accordance with various representative embodiments.

The depth information corresponding to image 500 is used to determine locations 610, 612 and 614 of the visible portions of the light emitting marker bands 108 in 3D space 600. Virtual bands are then fit to the 3D locations of the visible portions of the marker bands 108 to generate 3D positions of the virtual bands. These determinations may make use of an assumption that each marker band 108 lies in a geometric plane and has a designated shape. Each plane defines a virtual band with a center position from which a normal vector may be drawn, as indicated by the arrows. The normal vector, in turn, indicates an orientation of the limb segment to which the marker band 108 is attached.

FIG. 7 is a diagrammatic representation of a portion of a pose, in accordance with various representative embodiments.

The pose is determined by fitting a skeletal model to the 3D positions of the virtual bands. Inverse kinematic modeling may be used to determine the angle 702 and position of virtual joint 704 in 3D space 600. In turn, this defines the positions and orientations of limb segments 706 and 708.

As described above, when a body is viewed from a given camera position, about half of the body is simply not within the field of view of the camera. Additionally, some parts of the body may be hidden or obscured by other parts of the body located closer to the camera, and are not visible either. While the space in which the body is being viewed should be free of obstacles, the presence of obstacles, such as, for example, desks, chairs, etc., may interfere with camera's view of the body as it moves (i.e., as the person walks) through the space. And, when more than one body (i.e., person) is moving in the space, one person may walk in front of the other person. Accordingly, due to the location of the marker bands 108 on the limb segments 104 of the body 102, only certain portions of each marker band 108 will be visible to the camera. In an attempt to overcome this problem, traditional body pose tracking systems view the body from different viewing positions using multiple cameras in a pre-arranged space.

Embodiments of the present disclosure advantageously provide methods, systems, apparatuses and devices for body pose tracking that are simple, inexpensive, flexible, accurate and robust, and may be performed anywhere. In sharp contrast to traditional body pose tracking systems, embodiments of the present disclosure advantageously deploy marker bands 108 on the limb segments 104 of the body 102, acquire an image of the body 102, with depth information, from a single viewing position, and analytically determine the body pose by fitting a skeletal model to virtual bands that are synthesized from the 3D locations of the visible portions of the marker bands 108. However, when only a partial solution to the pose is determined (i.e., one or more limb segments 104 are missing from the pose), an ANN may be executed to complete the solution, which has been trained to infer or predict the positions and orientations of the limb segments 104 that are missing from the partial solution to the pose.

A neural network may be trained using a method of supervised learning. In this approach, a dataset containing inputs and corresponding desired outputs is used to adjust the parameters of the neural network. However, while inputs are easily obtained by capturing a video of a structure, the corresponding outputs, in the form of joint parameters, are not readily available. The present disclosure uses computer generated images of a body to generate a dataset. Computer animation systems are widely used for generating images for use in film, video game and AR/VR animation. These may be used to generate a dataset for training. Game engines such as 'Unity®' by Unity Technologies or 'Unreal Engine®' by Epic Games, Inc., provide an ability to build and animate a variety of virtual characters based on an inverse kinematic skeleton with an attached deformable mesh. Small areas of high luminance or intensity in a computed view are used to simulate the markers. A dataset may contain many different animations of common actions. A virtual camera simulates the capturing device from different views for dataset variety. For every camera view, it is determined which parts of the structure are visible to the camera and which are not. The computed image may be labeled with the non-visible (occluded) parts and the pose data (such as joint positions and angles). In this way, an artificial neural network is trained in a supervised manner to infer, with high accuracy and robustness, the pose of occluded body parts not visible to the camera.

The neural network can be also trained to account for inaccuracies resulting from misplaced light emitting markers. In the training dataset, markers are randomly displaced from their ideal positions, within some range of tolerance, while the virtual body provides exact joint parameters. In this way the neural network is trained to predict joint poses even when markers are not ideally placed.

Figure 8:
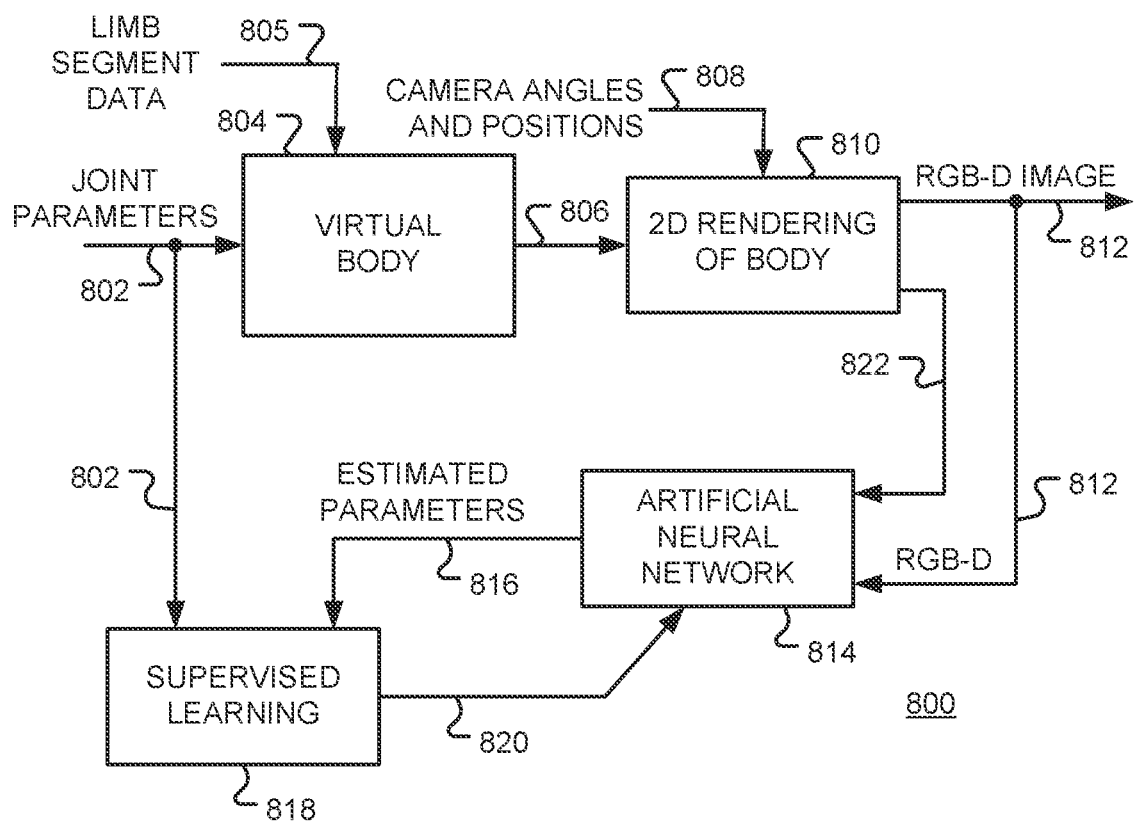
FIG. 8 is a block diagram of a training system for an artificial neural network, in accordance with various representative embodiments.

FIG. 8 is a block diagram of a training system 800 for an artificial neural network, in accordance with various representative embodiments.

Joint parameters 802, are input to a kinematic model 804 of a virtual body, together with other parameters, such as, for example limb segment data 805 (e.g., limb segment lengths, etc.). A range of limb segment lengths may be used. The kinematic model 804 may be provided by a gaming engine, for example, as discussed above. The kinematic model 804 generates a 3D model 806 of the body. Based on selected virtual camera angles and positions 808, rendering block 810 generates RGB-D (red, green, blue plus depth) images 812 showing locations of the visible portions of the marker bands on the limb segments. It is likely that locations of these marker bands, and the corresponding limb segments, may be determined by fitting virtual bands. Accordingly, the partial solution 822, corresponding to any identified joint angles and positions, may be input to the artificial neural network 814. Joint parameters 802, RGB-D image 812 and partial solution 822 provide one element of the dataset. The corresponding joint angles and positions provide another element of the dataset. A large variety of different poses, motions, body type, camera parameters etc., can be used to generate a large dataset for training artificial neural network 814. An advantage of this approach is that clean, high-resolution depth data is generated, together with accurate joint angles. In addition, user-controlled noise can be added to training data.

Artificial neural network 814 receives, inter alia, the RGB-D image 812 and partial solution 822 as input and generates estimated joint angles and positions (i.e., estimated parameters 816) as outputs. Supervised learning block 818 compares the estimated joint angles and positions to the actual joint angles and positions (i.e., joint parameters 802) and adjusts parameters of artificial neural network 814 accordingly, as depicted by arrow 820.

In other words, as discussed above, when determining the pose generates a partial solution of the pose, then the partial solution of the pose, the image, the depth information, camera information associated with the image, and limb segment data may be input to an artificial neural network (ANN) model. The ANN model is then executed to generate a final solution of the pose, which is output as described above. In one embodiment, the ANN may be executed by processor 128 of portable electronic device 132, while in another embodiment, the ANN may be executed by a processor of a server that is coupled to the portable electronic device 132 via one or more wired or wireless networks.

Before training the ANN, a virtual body is generated that includes virtual limb segments and virtual joints, and virtual marker bands are positioned around the virtual limb segments. Virtual poses are generated for each virtual camera position; each virtual pose includes 3D positions and angles of each virtual joint, 3D positions of each virtual limb segment, 3D positions of visible portions of each virtual marker band, and an RGB-D image of the virtual body including red pixels, green pixels, blue pixels, and depth pixels. The ANN model is then trained under supervised learning using the virtual poses.

Figure 9:
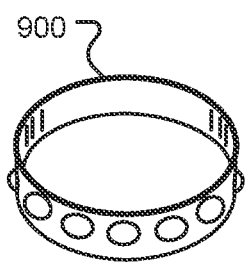
FIG. 9 shows an example of a band with markers, in accordance with various representative embodiments.

FIG. 9 shows an example of a band 900 with markers, in accordance with various representative embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term "configured to", when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A computer-implemented method, comprising:
    acquiring an image of a body including a plurality of limb segments, where the body is configured in a pose and a plurality of marker bands are positioned around the limb segments;
    acquiring depth information corresponding to distances to regions in the image;
    determining two-dimensional (2D) locations in the image corresponding to visible portions of the marker bands;
    determining, from the 2D locations and the depth information, three-dimensional (3D) locations of the visible portions of the marker bands;
    fitting virtual bands to the 3D locations of the visible portions of the marker bands to generate 3D positions of the virtual bands;
    determining the pose by fitting a skeletal model of the body to the 3D positions of the virtual bands; and
    outputting the pose.

2. The computer-implemented method of claim 1, where:
    each marker band includes a plurality of light emitters;
    the visible portions of the marker bands include one or more visible light emitters; and
    said determining 2D locations includes determining regions of higher light intensity associated with the visible light emitters.

3. The computer-implemented method of claim 2, where, for each marker band, the light emitters are light emitting diodes (LEDs) having a same color.

4. The computer-implemented method of claim 1, where:
each marker band includes light reflective material;
the visible portions of the marker bands include a visible portion of the light reflective material; and
said determining 2D locations includes determining regions of higher light intensity associated with the visible portions of the reflective light material.

5. The computer-implemented method of claim 1, where:
the skeletal model of the body is an inverse kinematic model of the body including at least a plurality of limb segments and a plurality of joints;
the 3D positions of the virtual bands define a center position of each virtual band;
each limb segment of the inverse kinematic model includes a central axis; and
said determining the pose includes iteratively adjusting the inverse kinematic model to align the central axes of the limb segments with the center positions of the virtual bands.

6. The computer-implemented method of claim 1, where:
the skeletal model of the body is an inverse kinematic model of the body including at least a plurality of limb segments and a plurality of joints;
the 3D positions of the virtual bands define a perimeter of each virtual band;
each limb segment of the inverse kinematic model includes a surface mesh; and
said determining the pose includes iteratively adjusting the inverse kinematic model to align the surface mesh of the limb segments with the perimeters of the virtual bands.

7. The computer-implemented method of claim 1, where the skeletal model of the body is an inverse kinematic model of the body including at least a plurality of limb segments and a plurality of joints, and the method further comprises:
when said determining the pose generates a partial solution of the pose:
inputting the partial solution of the pose, the image, the depth information, camera information associated with the image, and limb segment data to an artificial neural network (ANN) model;
executing the ANN model to generate a final solution of the pose; and
outputting the final solution of the pose,
where a virtual body includes at least a plurality of virtual limb segments and a plurality of virtual joints,
where a plurality of virtual marker bands are positioned around the virtual limb segments,
where the ANN model is trained under supervised learning using a plurality of virtual poses, each virtual pose including:
3D positions and angles of each virtual joint,
3D positions of each virtual limb segment,
3D positions of visible portions of each virtual marker band, and
a red green blue depth (RGB-D) image of the virtual body for each virtual camera position, the RGB-D image including red pixels, green pixels, blue pixels, and depth pixels.

8. The computer-implemented method of claim 1, where the skeletal model of the body is an inverse kinematic model of the body including at least a plurality of limb segments and a plurality of joints, and the method further comprises:
when said determining the pose generates a partial solution of the pose:
transmitting, to a server via a wireless network, the partial solution of the pose, the image, the depth information, camera information associated with the image, and limb segment data;
inputting, at the server, the partial solution of the pose, the image, the depth information, the camera information associated with the image, and the limb segment data to an artificial neural network (ANN) model, and
executing, at the server, the ANN model to generate a final solution of the pose;
receiving, from the server via the wireless network, the final solution of the pose; and
outputting the final solution of the pose.

9. A system, comprising:
a plurality of marker bands; and
an apparatus, including:
one or more cameras configured to:
acquire an image of a body including a plurality of limb segments, where the body is configured in a pose and the plurality of marker bands are positioned around the limb segments, and
acquire depth information corresponding to distances to regions in the image;
a memory configured to store the image, the depth information and a skeletal model of the body; and
a processor, coupled to the memory, configured to:
determine two-dimensional (2D) locations in the image corresponding to visible portions of the marker bands,
determine, from the 2D locations and the depth information, three-dimensional (3D) locations of the visible portions of the marker bands,
fit virtual bands to the 3D locations of the visible portions of the marker bands to generate 3D positions of the virtual bands,
determine the pose by fitting the skeletal model of the body to the 3D positions of the virtual bands, and
output the pose.

10. The system of claim 9, where:
each marker band includes a plurality of light emitters;
the visible portions of the marker bands include one or more visible light emitters; and
said determining 2D locations includes determining regions of higher light intensity associated with the visible light emitters.

11. The system of claim 10, where:
the light emitters are powered by one or more batteries;
the light emitters are light emitting diodes (LEDs); and
each marker band includes LEDs having a same color.

12. The system of claim 9, where:
each marker band includes light reflective material;
the visible portions of the marker bands include a visible portion of the light reflective material; and
said determining 2D locations includes determining regions of higher light intensity associated with the visible portions of the reflective light material.

13. The system of claim 9, where:
the apparatus is a handheld electronic device; and
one of the cameras is a depth camera configured to acquire the depth information, or
the depth information is acquired from respective concurrent images from two or more cameras.

14. The system of claim 9, where:
the skeletal model of the body is an inverse kinematic model of the body including at least a plurality of limb segments and a plurality of joints;
the 3D positions of the virtual bands define a center position of each virtual band;
each limb segment of the inverse kinematic model includes a central axis; and
said determine the pose includes iteratively adjusting the inverse kinematic model to align the central axes of the limb segments with the center positions of the virtual bands.

15. The system of claim 9, where:
the skeletal model of the body is an inverse kinematic model of the body including at least a plurality of limb segments and a plurality of joints;
the 3D positions of the virtual bands define a perimeter of each virtual band;
each limb segment of the inverse kinematic model includes a surface mesh; and
said determine the pose includes iteratively adjusting the inverse kinematic model to align the surface mesh of the limb segments with the perimeters of the virtual bands.

16. The system of claim 9, where:
the skeletal model of the body is an inverse kinematic model of the body including at least a plurality of limb segments and a plurality of joints;
when said determine the pose generates a partial solution of the pose, the processor is further configured to:
  input a data package to an artificial neural network (ANN) model, the data package including the partial solution of the pose, the image, the depth information, camera information associated with the image, and limb segment data,
  execute the ANN model to generate a final solution of the pose, and
  output the final solution of the pose;
a virtual body includes at least a plurality of virtual limb segments and a plurality of virtual joints;
a plurality of virtual marker bands are positioned around the virtual limb segments; and
the ANN model is trained under supervised learning using a plurality of virtual poses, each virtual pose including:
  3D positions and angles of each virtual joint,
  3D positions of each virtual limb segment,
  3D positions of visible portions of each virtual marker band,
  a red green blue depth (RGB-D) image of the virtual body for each virtual camera position, the RGB-D image including red pixels, green pixels, blue pixels, and depth pixels.

17. The system of claim 16, where the processor is further configured to input at least one of a previous data package or a previous final solution of the pose to the ANN model.

18. The system of claim 9, further comprising:
a server coupled to the apparatus via a wireless network,
where, when said determine the pose generates a partial solution of the pose, the processor is further configured to:
  transmit, to the server, the partial solution of the pose, the image, the depth information, camera information associated with the image, and limb segment data,
  receive, from the server, a final solution of the pose, and
  output the final solution of the pose, and
where the server includes a processor configured to:
  input the partial solution of the pose, the image, the depth information, the camera information associated with the image, and the limb segment data to an artificial neural network (ANN) model, and
  execute the ANN model to generate the final solution of the pose.

19. The system of claim 9, where the apparatus includes:
one camera to acquire the image; and
a depth sensor, co-located with the camera, to acquire the depth information,
where the image is a red green blue (RGB) image including red pixels, green pixels and blue pixels, and
where the depth information corresponds to the red pixels, the green pixels and the blue pixels.

20. The system of claim 9, where each marker band is adjustable to match a diameter of a respective limb.

* * * * *